US008473743B2

(12) United States Patent
Freedman et al.

(10) Patent No.: US 8,473,743 B2
(45) Date of Patent: Jun. 25, 2013

(54) MOBILE DEVICE MANAGEMENT

(75) Inventors: Gordie Freedman, Palo Alto, CA (US); David Rahardja, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 12/756,146

(22) Filed: Apr. 7, 2010

(65) Prior Publication Data

US 2011/0252240 A1 Oct. 13, 2011

(51) Int. Cl.
H04L 9/32 (2006.01)

(52) U.S. Cl.
USPC ............ 713/169; 713/168; 713/154; 726/29; 726/25; 726/1; 709/223

(58) Field of Classification Search
USPC .................. 713/169, 153, 168; 726/1, 25, 26
See application file for complete search history.

(56) References Cited

U.S. PATENT DOCUMENTS

| | | | |
|---|---|---|---|
| 6,741,853 B1 * | 5/2004 | Jiang et al. ................ 455/418 |
| 7,263,353 B2 | 8/2007 | Forsberg et al. |
| 7,469,139 B2 | 12/2008 | Van de Groenendaal |
| 7,765,402 B2 * | 7/2010 | Clark et al. ................ 713/168 |
| 7,983,419 B2 * | 7/2011 | Fan et al. .................. 380/255 |
| 8,032,409 B1 * | 10/2011 | Mikurak ................... 705/14.39 |
| 8,056,143 B2 * | 11/2011 | Brown et al. .............. 726/29 |
| 8,214,471 B2 * | 7/2012 | Doshi et al. ............... 709/221 |
| 2004/0199665 A1 * | 10/2004 | Omar et al. ............... 709/238 |
| 2007/0100978 A1 * | 5/2007 | Levi et al. ................ 709/223 |
| 2007/0259683 A1 * | 11/2007 | Hartikainen et al. ....... 455/550.1 |
| 2007/0286159 A1 * | 12/2007 | Preiss et al. ............... 370/352 |
| 2008/0313313 A1 | 12/2008 | Doshi et al. |
| 2009/0031008 A1 | 1/2009 | Elliott et al. |
| 2009/0036111 A1 | 2/2009 | Danford et al. |
| 2009/0222902 A1 * | 9/2009 | Bender et al. .............. 726/10 |
| 2009/0228566 A1 | 9/2009 | Sharp et al. |
| 2009/0307333 A1 * | 12/2009 | Welingkar et al. .......... 709/219 |
| 2010/0299719 A1 * | 11/2010 | Burks et al. ............... 726/3 |
| 2011/0185202 A1 * | 7/2011 | Black et al. ............... 713/320 |
| 2011/0213958 A1 * | 9/2011 | Lindholm et al. .......... 713/153 |
| 2011/0252240 A1 * | 10/2011 | Freedman et al. .......... 713/169 |
| 2012/0240183 A1 * | 9/2012 | Sinha ...................... 726/1 |

OTHER PUBLICATIONS

Andreas Pashalidis, Secure Network Management within an open-source mobile agent framework, Mar. 2004, Springer Link, vol. 12, pp. 9-31.*
U.S. Appl. No. 12/347,647, filed Dec. 31, 2008, titled "Secure Device Configuration Profiles", by inventor Mitchell D. Adler, et al., 53 pages (specification and drawings).

(Continued)

Primary Examiner — Nathan Flynn
Assistant Examiner — Viral Lakhia
(74) Attorney, Agent, or Firm — Womble Carlyle Sandridge & Rice LLP

(57) ABSTRACT

Methods and apparatuses that enroll a wireless device into an enterprise service with a management server addressed in a management profile are described. The enrollment may grant a control of configurations of the wireless device to the management server via the management profile. In response to receiving a notification from the management server, a trust of the notification may be verified against the management profile. If the trust is verified, a network session may be established with the management server. The network session may be secured via a certificate in the management profile. Management operations may be performed for management commands received over the secure network session to manage the configurations transparently to a user of the wireless device according to the control.

44 Claims, 9 Drawing Sheets

OTHER PUBLICATIONS

U.S. Appl. No. 12/198,037, filed Aug. 25, 2008, titled "Managing Notification Service Connections", by inventor Justin Santamaria and Christopher Marcellino, 46 pages (specification and drawings).

U.S. Appl. No. 12/235,537, filed Sep. 22, 2008, titled "Synchronization Improvements", by inventor Brendan A. McCarthy and Carsten Guenther, 56 pages (specification and drawings).

U.S. Appl. No. 61/151,125, filed Feb. 9, 2009, titled "Portable Electronic Device With Proximity-Based Content Synchronization", by inventor John G. Dorsey, 52 pages (specification and drawings).

U.S. Appl. No. 12/422,196, filed Apr. 10, 2009, titled "Portable Electronic Device With Proximity-Based Content Synchronization", by inventor John G. Dorsey, 53 pages (specification and drawings).

U.S. Appl. No. 61/165,334, filed Mar. 31, 2009, titled "Ad Hoc Distribution", by inventor Michael D. Korte, et al., 52 pages (specification and drawings).

U.S. Appl. No. 12/428,879, filed Apr. 23, 2009, titled "Ad Hoc Distribution", by inventor Michael D. Korte, et al., 52 pages (specification and drawings).

* cited by examiner

400

Enrolling a wireless device into an enterprise service via a management server addressed in a management profile, the enrollment to surrender an ownership (or control) of configurations for the wireless device to the management server 401

In response to receiving a notification from the management server, verifying a trust of the notification against the management profile 403

Establishing a network session with the management server if the trust is verified, the network session being secured via a certificate in the management profile 405

Performing management operations for management commands received over the secure network session to manage the configurations of the wireless device transparently to a user, e.g. without user interactions 407

Fig. 4

MOBILE DEVICE MANAGEMENT

FIELD OF THE INVENTION

The present invention relates generally to data processing systems. More particularly, this invention relates to on demand management of mobile devices.

BACKGROUND

With the proliferation of wireless, computer-implemented mobile devices, more and more business, enterprises, or organizations are required to provide enterprise services supporting these devices. However, these enterprises are faced with a myriad of management challenges relating to these mobile devices such as, for example, scalability, data and network security, reliability of communication channels, and other challenges. For example, cost of resources related to IT personnel, device capabilities, network bandwidths, and/or device power consumptions etc., may increase to an unsustainable level to deploy and maintain such services.

Further, still more challenges may be posed by flexibility to enable an enterprise service over existing mobile devices of employees or associates. For example, within an enterprise or organization, users and devices may be added, deleted and changed depending on third party service providers, such as phone services or data plans, subscribed via these devices. Furthermore, devices can be lost, destroyed, or removed from operations.

As such, management of the multitude of requirements to support modern usage of mobile devices for an enterprise or organization may tax resources, present security risks, and/or pose other problems.

SUMMARY OF THE DESCRIPTION

The invention enables enterprises or other organizations to deploy enterprise services for managing mobile devices OTA (over the air) in a flexible, scalable, secure and on demand manner. Mobile devices may be free to register or leave the enterprise services while ensuring the security of the services and integrity of the devices without requiring IT personnel to have physical access to the devices. Multiple levels of protections can be provided by leveraging push network infrastructures and multiple network connections with mutual verifications. In addition, extensibility and flexibility may be achieved by utilizing open and standard protocols and components.

An embodiment of the present invention can include methods and apparatuses that enroll a wireless device into an enterprise service with a management server addressed in a file, such as a management profile, for configuring the wireless device for the enterprise service. The enrollment may grant a control of configurations of the wireless device to the management server via the management profile. In response to receiving a notification from the management server, a trust of the notification may be verified against the management profile. If the trust is verified, a network session may be established with the management server. The network session may be secured via a certificate in the management profile. Management operations may be performed for management commands received over the secure network session to manage the configurations without user interactions or transparently to a user of the wireless device according to the control.

In one embodiment, a management profile may be installed into a configuration of the wireless device to participate in an enterprise service via a management server specified in the management profile. The configuration can include one or more profiles to configure the wireless device. The configuration may be locked for the enterprise service via the management profile to restrict changes of the configuration made by user instructions. Profiles installed through the enterprise service may be locked by the management server. In response to receiving one or more commands from the management server, updates on the configuration of the wireless device may be transparently applied to enable additional capabilities of the enterprise service in the wireless device. Optionally, the updates may be applied to disable existing capabilities of the wireless device not permitted in the enterprise service. The management profile may not be locked. For example, the management profile may be uninstalled from the wireless device according to user instructions to leave the enterprise service.

In another embodiment, a wireless device configured to participate in an enterprise service may receive a push notification from a server of the service. The wireless device may poll the server for a command. When receiving the command, the wireless device may process the command for the service. Subsequently, the wireless device may send back to the server the status of processing the command and poll the server for the next command. In one embodiment, the push notification may wake up the wireless device to verify if the push notification contains enough data to authenticate a sender of the push notification, e.g. based on a prearranged magic string. If the push notification is verified, an outgoing network connection from the wireless device to the server may be established. Parameters of the network connection may be based on a management profile installed in the wireless device. The network connection may be secured according to mutual authentication between the wireless device and the server using the server's SSL (Secure Socket Layer) certificate and an identity certificate in the management profile. In some embodiments, the wireless device may decide whether the server has a right to run the command in the wireless device according to a set of rights contained in the management profile and whether the wireless device is ready to process the command. The wireless device may send a reply to the management server indicating whether the command can be processed and/or a result of processing the command.

In yet another embodiment, a management profile having an identity certificate, may be generated. The management profile may indicate restrictions on user changes of a configuration of a wireless device according to a scope of an enterprise service. In response to receiving an enrollment request with the identity certificate from the wireless device, the identity certificate may be verified to register the wireless device in the enterprise service. A notification to the wireless device may be sent via a push network for a polling request for a polling request from the wireless device. Commands may be sent to manage the configuration of the wireless device for the enterprise service in response to receiving the polling request from the wireless device via a second network session separate from the push network.

BRIEF DESCRIPTION OF THE DRAWINGS

The present invention is illustrated by way of example and not limitation in the figures of the accompanying drawings in which like references indicate similar elements.

FIG. 4 is a flow diagram illustrating one embodiment of a process to enroll a mobile device in an enterprise service;

DETAILED DESCRIPTION

Figure 1:
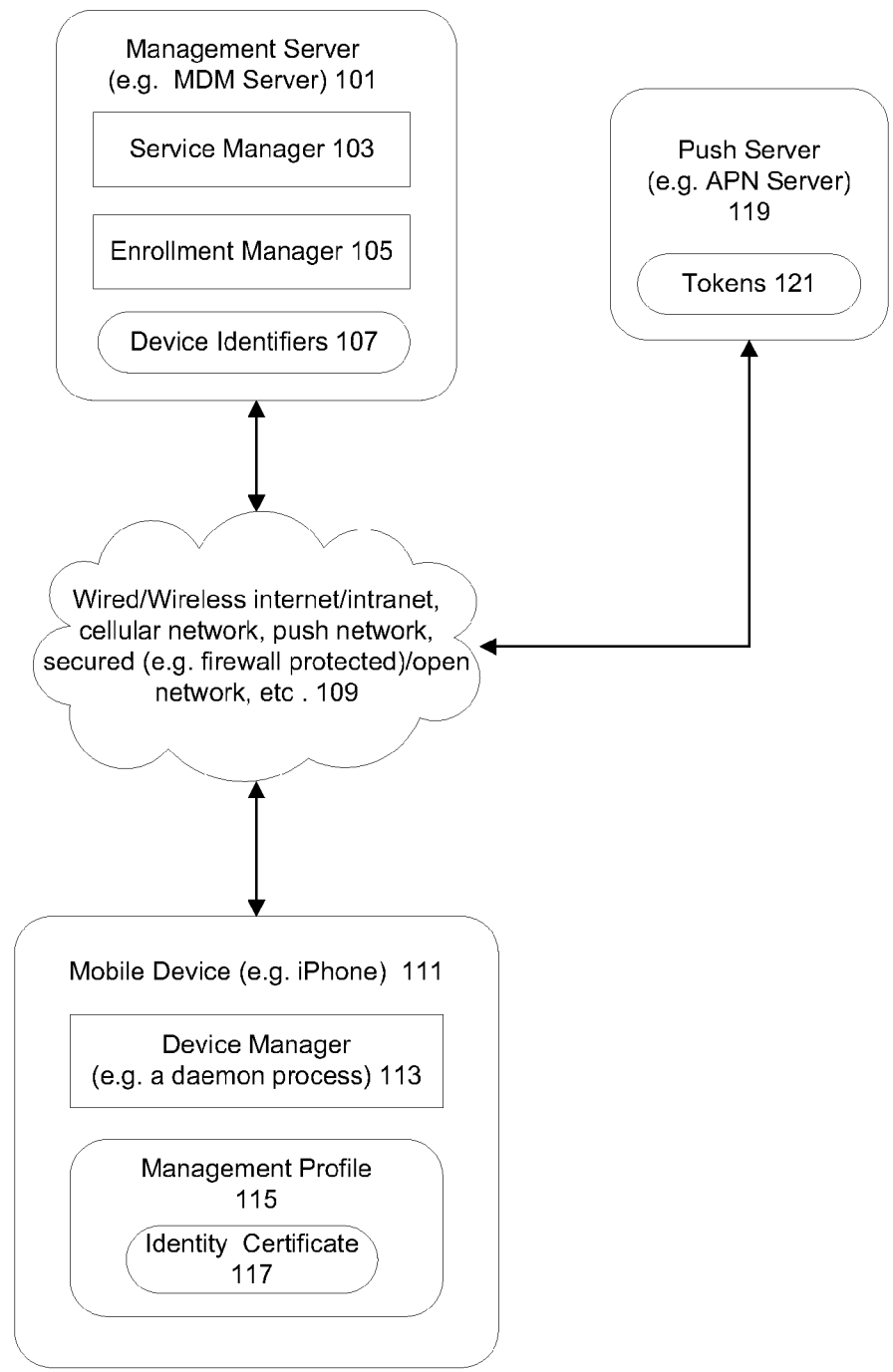
FIG. 1 is a block diagram illustrating one embodiment of networked systems to manage mobile devices for an enterprise.

Method and apparatus for management of mobile devices are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

In one embodiment, mobile device management may allow organizations of various sizes (e.g. large enterprises or a small businesses) to manage and/or administer mobile devices over the air (OTA), on demand, in a scalable, secure and flexible manner. Each individual device may self enroll in the enterprise service over the air. Additionally, management services within the enterprise service, e.g. updating certificates, profiles, removing/installing applications, status querying etc., may be performed to the devices without user interactions, over the air, unattended by and/or invisible to device users. A large number of devices can be readily deployed for the enterprise service without a need to present the devices to enterprise personnel nor to physically plug the devices into enterprise computers.

According to one embodiment, each device may voluntarily connect to a remote management server, e.g. an MDM (Mobile Device Management) server, of an enterprise service to enroll in the enterprise service on demand, e.g. based on a user operation to install a profile in the device. By joining the enterprise service, the device may grant a control (or a portion of its ownership), such as capability to update device configurations, installing and/or provisioning applications etc., and let the management server control the device over the air.

For example, an IT administrator may have a right via the management server to inspect, install, or remove profiles to/from the device, clear passcodes, begin secure erase on the device and/or query a complete list of profiles or provisioning profiles in the device. However, the management server may be prohibited from removing profiles and/or provisioning profiles that are not installed by the management server. Each device may terminate the relationship with the enterprise service at any time voluntarily to reclaim the ownership of the device and/or to restore the configuration of the device to a state prior to enrolling in the enterprise service.

Once a device has enrolled in an enterprise service (i.e. has become a managed device), according to one embodiment, management services may be delivered to the managed device from a management server of the enterprise service securely via a mechanism leveraging a push network coupling the management server and the mobile device. The push network may enable the management server to push a notification to wake up the mobile device (or a device manager waiting in the mobile device) for receiving management services. In turn, after verifying a trust of the notification pushed, the mobile device may poll the management server via separate secure network connections to retrieve commands for the management services via the secure network connections. The management server may be based on extensible web service capabilities using standard and open protocols, such as XML (Extensible Markup Language), HTTPS (Hypertext Transfer Protocol Secure) to support transactions over the secure network connections.

As such, according to one embodiment, mobile device management may offer a plug and play mechanism with high degrees of extensibilities and securities for an enterprise to deploy an enterprise service and for a user of a mobile device to join or leave the enterprise service. Security can be enhanced by mutual verifications via separate network connections between a management server and a managed device. Additionally, valuable processing resources are preserved or optimized without keeping long standing persistent connections between the management server and the mobile devices. Battery life of the managed device may be prolonged as a management process remains dormant (or in a sleep state) when the managed device is not being configured. Further, scalability of the management server can be significantly improved by leveraging existing push network infrastructure without keeping track of constantly changing addresses of each mobile device individually.

FIG. 1 is a block diagram illustrating one embodiment of networked systems to manage mobile devices for an enterprise. Networked systems 100 may include one or more servers (or hosts), such as management server 101, coupled to one or more devices, such as mobile device 111, via networks 109. Management server 101 may belong to a data processing infrastructure which provides an enterprise service to manage mobile device 111. In one embodiment, network 109 may allow network connections (e.g. for sending a push notification) to be established between management server 101 and mobile device 111 via the open Internet, an intranet, firewall protected secure networks, wide area cellular networks (e.g. a 3G network), etc. Networks 109 may be wired, wireless (such as Wi-Fi, Bluetooth etc), or a combination of both.

In one embodiment, management server 101 may be an HTTPS server deployed for an enterprise with a trusted SSL (Secure Socket Layer) certificate. Push server 119 may include a push network service, such as Apple Push Notification Service (APNS), to deliver a "wake up" message or a push notification to mobile device 111 via network 109. The push network may be based on regular Internet, Wi-Fi, 3G network or other communication mechanisms to deliver a push notification. Tokens 121 may include identifiers or tokens of target devices in a push network for push server 119 to forward push messages. For example, device identifiers 107 may include one of tokens 121 associated with mobile device 111 for management server 101 to push a notification to mobile device 111. Separate secure network connections, e.g. HTTPS network sessions, may be established between management server 101 and mobile device 111 via network 109 for enrolling mobile device 111 into the enterprise service and/or managing mobile devices 111 within the enterprise service. In some embodiments, system 100 may include multiple management servers and/or push servers. An enterprise service may be managed by more than one management servers. System 100 may include multiple enterprise services managed by multiple management servers.

According to one embodiment, management server 101 may include enrollment manager 105 (e.g. a process or a module/handler) to enroll mobile device 111 into an enterprise service. Enrollment manager 105 may store device identifiers 107 for mobile device 111 in response to a check in request sent from mobile device 111 via network 109 (e.g. a HTTPS connection). Device identifiers 107 may include entities received from mobile device 111 during enrollment (or check in) operations, such as a UDID (unique device identifier) uniquely identifying mobile device 111, a push token for a push notification to reach mobile device 111, and/or a magic string for verifying a trust of the push notification.

Management server 101 may include service manager 103 to manage mobile device 111 within an enterprise service if mobile device 111 has completed enrolling in the enterprise. For example, server manager 103 may notify mobile device 111 to contact management server 101 for device management operations by a push notification via network 109 according to device identifiers 107. Subsequently, secure network connections may be established between management server 101 and mobile device 111 over network 109. Service manager 103 may communicate with mobile device 111 over the established network connection for device management, such as sending management commands to query current status (e.g. existing configurations) of mobile device 111, and/or to update/change a configuration of mobile device 111 accordingly.

In one embodiment, mobile device 111 may be a network enabled phone device, such as iPhone® device from Apple Inc. Mobile device 111 may freely participate or leave an enterprise service associated with management server 101, e.g. based on installing/uninstalling management profile 115. Typically, an enterprise may distribute management profile 115 (e.g. as one or more files) accessible for mobile devices to install locally (e.g. via USB connections) via desktop computers, storage devices, etc., remotely (e.g. over the air) via emails, web pages, etc., or using other communication mechanisms. For example, the web pages may be provided via a self-service web portal, such as based on OTA profile enrollment mechanisms from Apple Inc. Installation of management profile 115 into mobile device 111 may be independent of network 109.

In one embodiment, management profile 115 may include network addresses via network 109 to a predetermined web service, such as provided by management server 101, for mobile device 111 to connect to for checking in an enterprise service and/or to receive management commands and return results. Additionally, management profile 115 may include identity certificate 117 as a certificate payload for mobile device 111 to authenticate itself to management server 101 over SSL network connection via network 109. In other embodiments, certificate 117 may be obtained through SCEP (Simple Certificate Enrollment Protocol). Once management profile 115 is removed (or uninstalled) from mobile device 111, mobile device 111 may no longer participate in the enterprise service associated with management server 101.

Mobile device 111 may include device manager 113 to perform management operations in response to management commands received from management server 101 via network 109. In one embodiment, device manager 113 may be a daemon process which sleeps while waiting for a notification pushed from management server 101. A processing unit may suspend a process or thread in a sleep state and execute other processes or threads. The processing unit may continue to execute the suspended process or thread when they wake up from the sleep state.

Device manager 113 may wake up in response to the notification received. For example, device manager 113 may initiate secure network connections via network 109 with management server 101 as addressed in management profile 113 to perform management operations commanded by the management server 101 over the secure network connections. Device manager 113 may go back to sleep, e.g. when instructed by the management server 101 or when deferring performing certain management operations. In some embodiments, device manager 113 may disconnect the secure network connection prior to going back to sleep.

Figure 2:
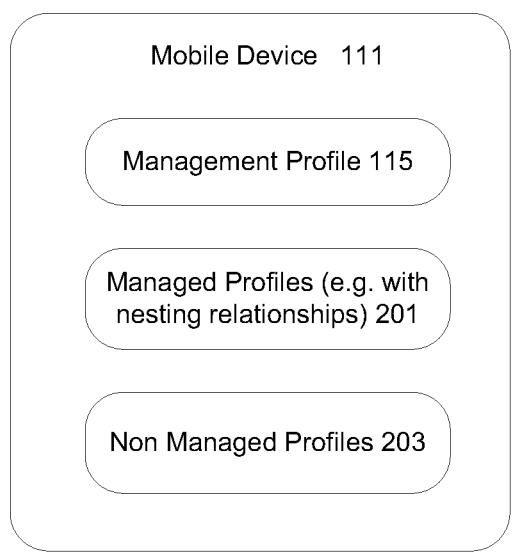
FIG. 2 is a block diagram illustrating exemplary profiles for managing a mobile device according to the embodiments described herein.

FIG. 2 is a block diagram illustrating exemplary profiles for managing a mobile device according to the embodiments described herein. For example, mobile device 111 may enroll in an enterprise service in network systems 100 of FIG. 1. In one embodiment, a configuration of mobile device 111 may correspond to a collection of profiles installed in the device. Profiles may be serialized as property lists stored as a file to configure certain (single or multiple) settings of mobile device 111.

For example, a provisioning profile associated with an application installed in mobile device 111 may authorize mobile device 111 to run the application. Restriction profiles may indicate whether to enable certain features or capabilities (e.g. camera, video conferencing, location services, multiplayer gaming, JavaScript, UI pop-up messages, application purchases, etc.) and/or to specify constraints on system and/or application settings (e.g. minimum/maximum sizes of password strings, range of parameter values, etc.). In some embodiments, multiple restriction profiles for a common setting may be condensed by adopting the constraints for the common setting that satisfy each restriction profile, or the most restricted constraints among the multiple restriction profiles.

Management profile 115 may indicate the existence of a relationship with the enterprise service to grant a control of mobile device 111 to a host, such as management server 101 of the enterprise service. The control may allow the management server to remotely command changes of the configuration in mobile device 111 while prohibiting, preventing or limiting possible updates directly from instructions of a device user.

In one embodiment, a profile may include one or more components (e.g. payloads). For example, management profile 115 may include payloads such as a certificate identifier, a topic, at least one server URL (Universal Resource Locator), and/or access right restrictions, etc. The certificate identifier may represent a certificate, such as identity certificate 117 for mobile device 111 to authenticate itself to management server. The topic may be a string for a push network interface in mobile device 111 to listen to for push notifications. A server URL may specify a network address for mobile device 111 to contact to retrieve device management instructions or commands, and/or to check in the enterprise service during installation of management profile 115.

In one embodiment, managed profiles 201 may include profiles installed through an enterprise service, e.g. via management server 101 of FIG. 1. Managed profiles 201 may represent updates (or changes) to a configuration of mobile device 111 as remotely imposed by the enterprise service. Installing a managed profile may retain internally a list of other profiles managed by or having dependency relationships with the installed profile.

For example, a managed provisioning profile for an email application may have dependency relationships with a managed email profile for email account settings of the email application, a managed VPN (Virtual Private Network) profile for VPN settings for the email application, etc. In one embodiment, relationships retained among managed profiles 201 may form nesting relationships rooted at management profile 115. A user of mobile device 111 may be prohibited from accessing or removing managed profiles 201, which may be locked by the enterprise service. On the other hand, management profile 115 may not be locked to allow the user to leave the enterprise service by uninstalling the management profile 115. Managed profiles 201 may be automatically removed when management profile 115 (or payloads within management profile 115) are removed.

In one embodiment, non managed profiles 203 may include profiles not installed by an enterprise service for mobile device 111. For example, non managed profiles 203 may include a restriction profile installed prior to enrolling the enterprise service (or installing the management profile 115). For example, the restriction profile may enable a certain feature, such as multiplayer gaming capability, for mobile device 111. After checking in the enterprise service, multiplayer gaming capability for mobile device 111 may be disabled via a managed restriction profile in managed profiles 201 installed from a management server. In one embodiment, once mobile device 111 leaves the enterprise service (e.g. by uninstalling management profile 115 and automatic removal of managed profiles 201), configuration of mobile device 111 may be restored to enable multiplayer gaming according to non managed profiles 203.

Figure 3:
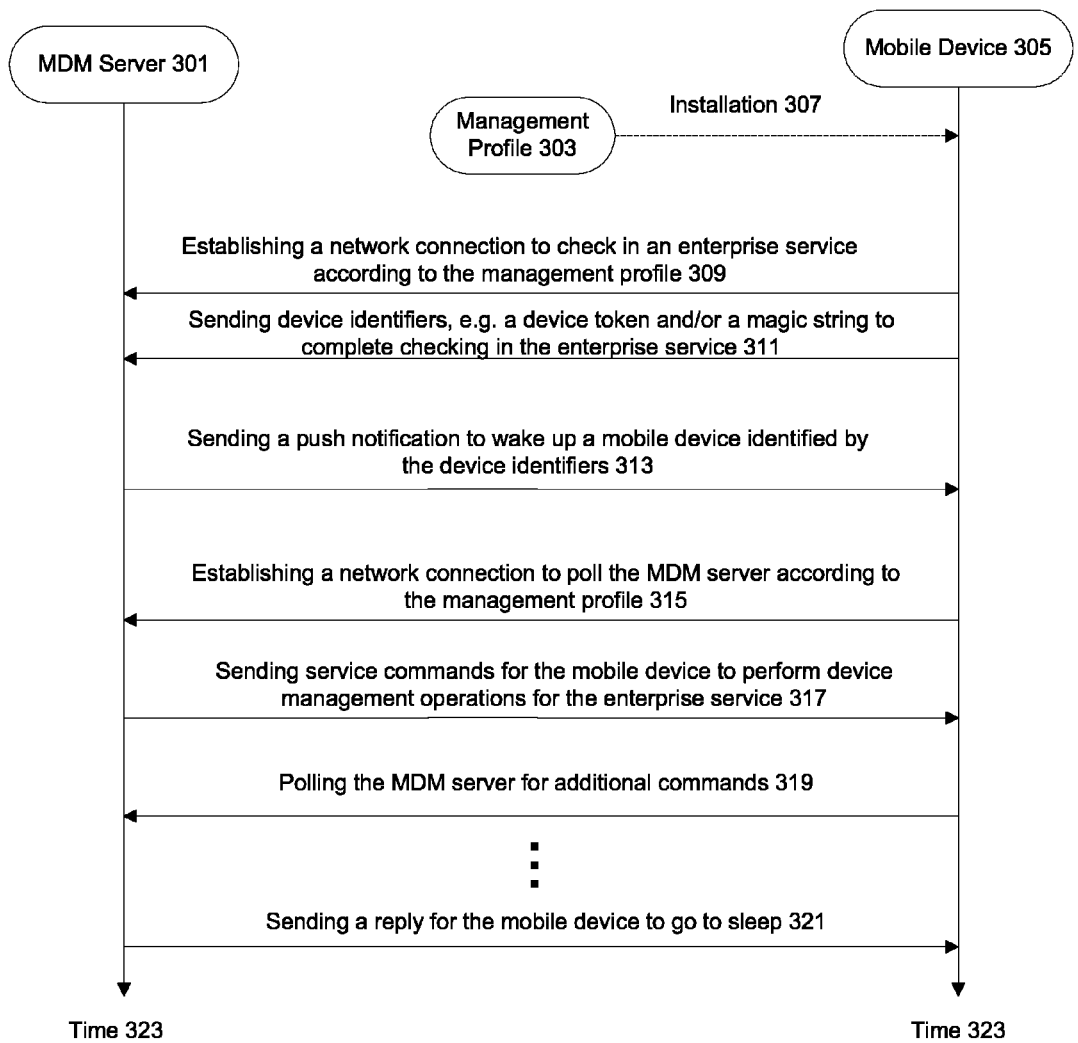
FIG. 3 is a sequence diagram illustrating exemplary message exchanges managing a mobile device according to the embodiments described herein.

FIG. 3 is a sequence diagram illustrating exemplary message exchanges for managing a mobile device from a host according to the embodiments described herein. In one embodiment, MDM server 301 may be a host implementing an enterprise service for an enterprise to manage mobile devices in an on demand manner, such as management server 101 of FIG. 1. Mobile device 305, such as mobile device 111 of FIG. 1, may be coupled with MDM server 301 via a network, such as network 109 of FIG. 1, to check in or out the enterprise service at will freely as demanded by a device user. MDM server 301 may not be aware of the existence of mobile device 111 outside the enterprise service (e.g. prior to mobile device 305 checking in the enterprise service and/or subsequent to mobile device 305 checking out of the enterprise service).

At sequence 307, in one embodiment, mobile device 305 may install management profile 303 to check in to an enterprise service. Management profile 303, such as management profile 113 of FIG. 1, may be distributed by an enterprise offering the enterprise service via open and standard file distribution channels, such as emails, web pages, disk files, etc., available for mobile device 305 to access. According to one embodiment, during installation of management profile 303, mobile device 305 may start an MDM service, such as device manager 111 of FIG. 1, to perform check in operations, for example, in response to detecting the presence of an MDM payload in management profile 303. Installation of management profile 303 may fail if the check in operations are not successfully performed. Typically, the MDM service may go to sleep after mobile device 305 checks in to the enterprise service.

At sequence 309, mobile device 305 may attempt to contact MDM server 301 addressed according to a server URL in management profile 303 to check in an enterprise service. Mobile device 305 may present an identity certificate, such as certificate 115 of FIG. 1, obtained from management profile 303 to MDM server 301 for authentication. If successfully authenticated, a secure network connection may be established between MDM server 301 and mobile device 305. In one embodiment, check in operations may include a variety of cross checks to verify a trust between MDM server 301 and mobile device 305 via the secure network connection. Optionally, MDM server 301 may forward configuration profiles to configure enterprise services in mobile device 305, such as password restrictions, certificates etc. for the enterprise service.

If MDM server 301 accepts mobile device 305 into an enterprise service, at sequence 311, mobile device 305 may provide MDM server 301 device identifiers, such as device identifiers 107 of FIG. 1, to complete check in or registration operations for the enterprise service. The device identifiers may include a push token, a magic string and/or a topic string to allow MDM server 301 to send push notifications to mobile device 305. The push token may be an identifier verified in a push network, such as network 109 of FIG. 1, to deliver a push message to mobile device 305. The magic string may be generated in mobile device 305 with unique characteristics (e.g. a string with certain length to ensure its uniqueness) for mobile device 305 to verify a trust of received push messages for preventing malicious attack from un-trusted hosts via the push network. The topic string may indicate which topic mobile device 305 listens to for incoming push messages via the push network.

In one embodiment, mobile device 305 may use a check in protocol to validate device eligibility during initialization for enrolling in the enterprise service (or MDM enrollment). Mobile device 305 may communicate with MDM server 301 for installing management profile 303 based on the check in protocol. In certain embodiments, when detecting changes (e.g. according to a push network) of associated identifiers, such as the push token and/or the topic string, mobile device 305 may use the check in protocol or other similar protocols to automatically check in with MDM server 301 to report and update the changes.

At sequence 313, to cause mobile device 305 to poll for commands, MDM server 301 may send a push notification, e.g. via a gateway in a push network. The push notification may reach mobile device 305 according to device identifiers received via check in operations. In some embodiments, the push notification may wake up mobile device 305 to cause the device to poll MDM server 301 for management commands. MDM server 301 may use a certificate including a topic of the device identifiers as a subject for the push notification. Optionally, the push notification may include a message containing a magic string of the device identifiers.

In one embodiment, mobile device 305 may reject the push notification and go back to sleep if a trust of the push notification cannot be established. In one embodiment, the trust of the push notification may depend on matching identifies retrieved from the push notification with expected identities locally stored in mobile device 305, such as a topic string and/or a magic string. A push notification carrying extra or unexpected information may also be rejected.

At sequence 315, mobile device 305 may respond to a push notification by contacting MDM server 301, e.g. using HTTPS protocols. In one embodiment, the push notification may arrive at mobile device 305 to wake up an MDM service dormant or sleeping in mobile device 305. The MDM service may establish or initiate a network connection, e.g. an HTTPS based connection, to MDM server 301 addressed in management profile 303 to poll for commands to perform management operations for an enterprise service. In turn, at sequence 317, MDM server 301 may deliver one or more commands, e.g. by enclosing them in an HTTP reply via the established network connection. MDM service may perform management operations according to the commands received and send a reply over the same network connection to poll for additional commands. Subsequently, MDM server 301 can then reply with next command (or commands).

Alternatively, at sequence 321, MDM server 301 may end the network connection by sending a 200 OK status with an empty body. In turn, mobile device 305 (or an MDM service) may go to sleep waiting to be woken up by another push notification. Sequences 313 . . . 321 may iterate along time 323 as short burst of activities for the duration when mobile device 305 remains enrolled in an enterprise service managed via MDM server 301.

In one embodiment, if a network connection between MDM server 301 and mobile device 305 is broken while mobile device 305 is performing a command received from the network connection, mobile device 305 may cache the result of the command and re-attempt connection to MDM server 301, for example, when a user unlocks mobile device 305 or in response to changes in network conditions. In some embodiments, if MDM server 301 sends multiple push notifications to mobile device 305, a push network may coalesce these notifications (e.g. in a queue) and deliver the last one (or the latest one) to the device.

FIG. 4 is a flow diagram illustrating one embodiment of a process to enroll a mobile device in an enterprise service. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. At block 401, the processing logic of process 400 can enroll a wireless device into an enterprise service via a management server addressed in a management profile. For example, the processing logic of process 400 may wake up in response to an installation of the management profile to the wireless device. The processing logic of process 400 may retrieve an URL address for the management server from the management profile to establish a secure network connection to exchange messages with the management server to complete the enrollment.

In one embodiment, the processing logic of process 400 may grant control of configurations for a wireless device to a management server after enrolling or checking in an enterprise service associated with the management server. The control of the configurations may include specifications of rights for access and/or update profiles in the wireless device. For example, the management server may be capable of providing limitations representing a scope of control for the mobile device available to a user. In one embodiment, a management profile installed to check in the mobile device into the enterprise service may include specifications of a list of access rights for the management server. Access rights may indicate which management operations are allowed under an enterprise service.

For example, access rights may be related to inspection of profile manifest, installation and removal of profiles, device lock and passcode/password removal, device erase (e.g. to completely reconfigure a mobile device), query of device information (e.g. device capacity, serial number etc.), query of network information (e.g. phone number, subscriber identity module numbers, media access control addresses), query for location information, inspection of installed provisioning profiles, installation and removal of provisioning profiles, inspection of installed applications, restriction-related queries and/or security-related queries. The processing logic of process 400 may enroll a mobile device in the enterprise service without giving up all rights to control the mobile device.

In one embodiment, at block 403, the processing logic of process 400 may verify a trust of a push notification received from a management server. The processing logic of process 400 may wake up in response to receiving the push notification. In one embodiment, the processing logic of process 400 may extract a topic string and a magic string from a payload of the push notification to compare with corresponding strings stored in a management profile to determine if the push notification can be trusted. If there is string mismatch, the processing logic of process 400 may ignore the push notification and go back to sleep.

Otherwise, if a push notification is verified at block 405, the processing logic of process may establish a network session with a management server according to an URL address specified in a management profile. The network session may be secured via a certificate in the management profile. The certificate may allow the management server to cryptographically verify a trust of a device owning the certificate. The processing logic of process 400 may send a polling message to the management server over the network session to receive one or more management commands.

At block 407, the processing logic of process 400 may perform management operations for management commands received over secure network connection from a management server to manage configurations of a wireless device. In one embodiment, the processing logic of process 400 may wake up to contact the management server and perform the management operations in the background of the wireless device transparently to a user, regardless whether the user is currently operating the mobile device or not. Subsequently, the processing logic of process 400 may return a result of the management operations to the management server to receive additional commands for performing further management options until when instructed by the management server.

For example, management operations may retrieve information of a mobile device, such as model number, operating system version, security restrictions (e.g. levels of security, password strength, support of hardware encryption checking), etc. for a management server to determine if the mobile device is currently configured for a new feature update. If the mobile device is not properly configured, e.g. running an improper version of operating system, the management server may configure the mobile device accordingly before sending update commands for the new feature.

In some embodiment, management operations may backup information on profiles in the mobile device to the management server to allow future device clean up and/or restoration. The processing logic of process 400 may lock down the mobile device, e.g. to prohibit installation of new applications. In one embodiment, the processing logic of process 400 may keep the mobile device unlocked as commanded from the management server to prevent a user from locking certain profiles, resources, the device, or even powering off the device while performing management operations for the management server.

Figure 5:
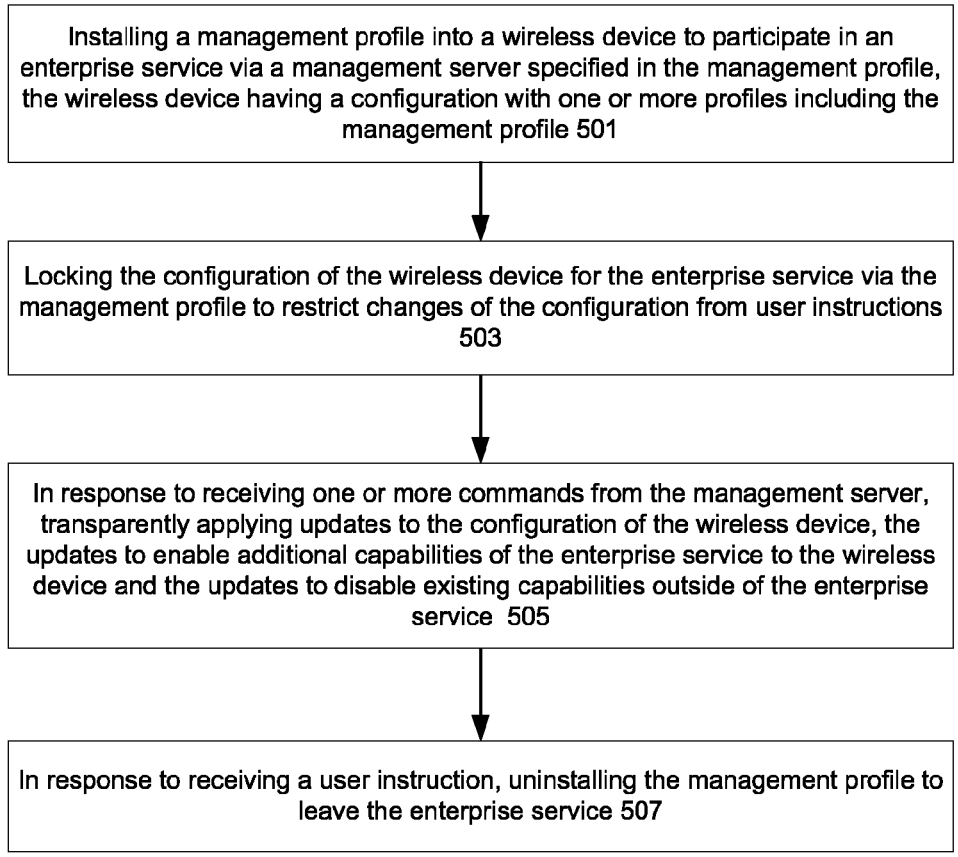
FIG. 5 is a flow diagram illustrating one embodiment of a process to enable a mobile device to participate in and/or leave an enterprise service.

FIG. 5 is a flow diagram illustrating one embodiment of a process to enable a mobile device to participate in and/or leave an enterprise service. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 can install a management profile, e.g. in response to a user instruction, into a wireless device to participate in an enterprise service via a management server specified in the management profile. The mobile device may have a configuration with one or more profiles including the management profile when participating in the enterprise service.

At block 503, in one embodiment, the processing logic of process 500 may lock down a configuration of a wireless device for an enterprise service via an installed management profile to restrict changes of the configuration from user instructions. For example, the processing logic of process 500 may restrict certain functions of the wireless device, such as camera function, location services, and/or video sharing etc. when locking the configuration. In one embodiment, the processing logic of process 500 may send a polling command to a management server to receive restriction commands on successful installation of the management profile. For example, the processing logic of process 500 may install restriction profiles to the configuration of the wireless device according to the restriction commands received.

Subsequently at block 505, in response to receiving one or more commands from a management server, the processing logic of process 500 may transparently apply updates to a configuration of a wireless device according to the received commands. The updates may be applied to install a profile into, to replace an existing profile of, and/or to remove an existing profile from the configuration of the wireless device. The processing logic of process 500 may wake up from a sleep state (e.g. not fully running to preserve processing resource in the mobile device) in response to a notification pushed from the management server to poll the management server to retrieve the commands.

In one embodiment, updates to a configuration of a mobile device commanded from a management server may include enabling capabilities and/or adding additional features provided by an enterprise service to the wireless device. For example, the updates may cause installing a provisioning profile to enable an application installed in the mobile device, installing a certificate profile for allowing VPN (Virtual Private Network) access to a corporate firewall, replacing an expired email certificate, updating account configuration to move email accounts to a different server, and/or renewing a WiFi password to access a hot spot, etc. In one embodiment, a provisioning profile may include a bundle of information cryptographically signed to allow the mobile device to decide whether to run an application or not.

In another embodiment, the processing logic of process 500 may apply updates to a configuration of a mobile device to disable or restrict existing capabilities prohibited by an enterprise service. For example, the updates may cause removing of a provisioning profile to disable an application outside an enterprise service (or not permitted by the enterprise service), adding a restriction profile specifying strong passcode requirement, removing a certificate profile with a VPN certificate for a firewall to prohibit access to a corresponding firewall, etc.

At block 507, according to certain embodiments, the processing logic of process 500 may uninstall a management profile from a mobile device to leave an enterprise service. For example, the processing logic of process 500 may respond to a user instruction to check out an enterprise service by removing the management profile corresponding to the enterprise service. In one embodiment, multiple management profiles may exist in a configuration of the mobile device enrolling to more than one separate enterprise services. The processing logic of process 500 may terminate a relationship with the enterprise service when the management profile is removed. For example, the processing logic of process 500 may remove managed profiles associated with the management profile from the configuration. Consequently, features (e.g. corporate email accounts), privileges (e.g. accesses to corporate fire walls), or capabilities (e.g. authorized by provisioning profiles) specific to the enterprise services may be lost. The processing logic of process 500 may follow a set of rules to determine which files to remove. The processing logic of process 500 may not remove installed applications when the relationship is terminated to preserve application data for possible reestablishment of the relationship in the future.

Figure 6:
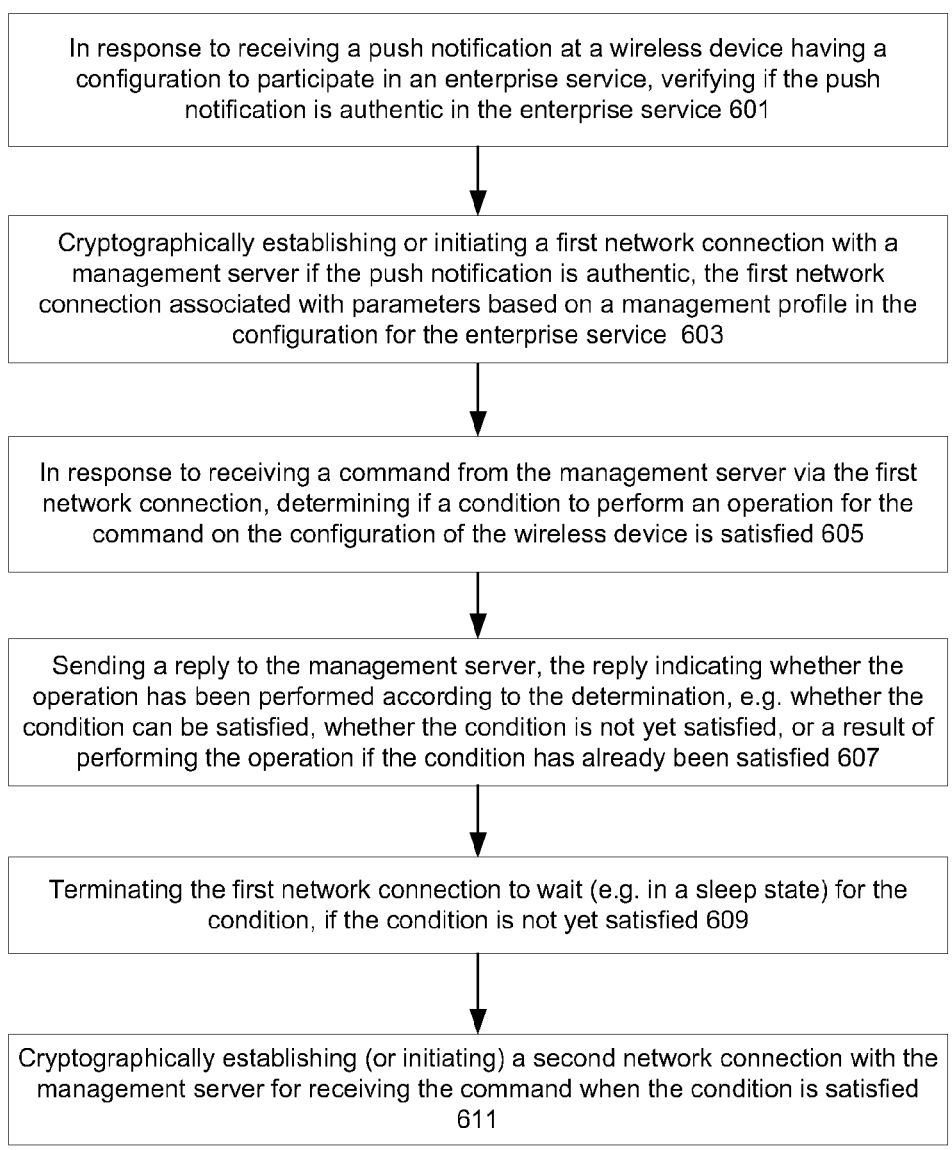
FIG. 6 is a flow diagram illustrating one embodiment of a process to perform management operations securely in a mobile device for an enterprise service.

FIG. 6 is a flow diagram illustrating one embodiment of a process to perform management operations securely in a mobile device for an enterprise service. Exemplary process 600 may be performed by a processing logic that may comprise hardware (circuitry, dedicated logic, etc.), software (such as is run on a dedicated machine), or a combination of both. For example, process 600 may be performed by some components of system 100, such as device 111, in FIG. 1. At block 601, the processing logic of process 600 can verify if a push notification received at a wireless device is authentic in an enterprise service. The wireless device may be configured to participate in the enterprise service, e.g. via a management profile in a configuration of the wireless device. In one embodiment, the wireless device may store one or more identities such as a magic string. The processing logic of process 600 may generate the magic string representing a high level of uniqueness specific to the wireless device (e.g. based on unique hardware serial numbers and/or the randomness of the string). The push notification may carry payload data. Authenticity of the push notification may be based on whether the payload data is of an expected size and/or whether the payload data include a string matching the magic string.

If a push notification is verified as authentic, at block 603, the processing logic of process 600 may cryptographically initiate or establish a first network connection or session with a management server. The first network connection may be associated with parameters based on a management profile in a wireless device. For example, the parameters may include a URL string and/or a port number specified in the management profile for the management server. In one embodiment, the processing logic of process 600 may present a certificate in the management profile to the management server to ensure the first network connection is secure. The processing logic of process 600 may terminate the first network session in response to receiving a response indicating a failure to verify the certificate.

At block 605, the processing logic of process 600 may receive a command from a management server to perform an operation on a configuration or settings of a wireless device via the first network connection. In response, the processing logic of process 600 may determine if a condition to perform the operation is satisfied. The processing logic of process 600 may determine if the management server has a right to the operation for the command according to a set of rights specified in a management profile. If the operation or command does not violate any of the specified rights, the processing logic of process 600 may determine whether the wireless device is ready for the operation according to additional constraints of the condition.

Constraints of a condition to perform an operation in a wireless device may be related to, for example, whether the device is locked (e.g. by a user) if the operation is to modify a data setting or database of the wireless device, whether certain applications (e.g. gaming applications) are currently running, or whether a network is accessible (e.g. offline or online), etc. In one embodiment, the processing logic of process 600 may determine a condition is not satisfied if an attempt to establish a network session or connection with a management server fails and/or a connection with the management server is lost (e.g. when a mobile device is placed in an isolated area, such as within a tunnel without access to network).

At block 607, the processing logic of process 600 may send a reply to a management server. The reply may indicate whether one or more operations for a command have been performed according a condition determined for the operations. For example, the reply may include indicators indicating whether the command is not allowed (e.g. "rejected") because the condition may never be satisfied), whether the condition is not yet satisfied (e.g. "not now") and/or a result of performing the operations if the condition is satisfied (e.g. "performed"). The processing logic of process 600 may proceed to perform the operations if the condition is satisfied before sending a reply back to the management server.

At block 609, if a condition is not yet satisfied for performing an operation for a command received via a first network connection, in one embodiment, the processing logic of process 600 may terminate the first network connection to wait (e.g. go into a sleep state) for the condition. The processing logic of process 600 may receive an acknowledgement from a management server to complete message exchanges over the first network session prior to the termination of the first network connection. Optionally, the processing logic of process 600 may receive the same command again from the management server to determine if the condition has been satisfied to perform the operations.

At block 611, in one embodiment, the processing logic of process 600 may wake up to cryptographically initiate or establish a second network connection with a management server to poll for a command. In one embodiment, prior to going to sleep, the processing logic of process 600 may store a cookie data indicating deferment for the command. Alternatively, the processing logic of process 600 may log system events for a condition to perform an operation for the command. The processing logic of process 600 may wake up when the system events are triggered by the occurrence of the condition (e.g. a device is unlocked or a change of network availability). On waking up, the processing logic of process 600 may inspect the cookie data without verifying a push notification and establish the second network connection. In one embodiment, the processing logic of process 600 may continue to poll the management server until a successful transaction for a command is completed. Typically, the processing logic of process 600 may not save the command that was refused.

Figure 7:
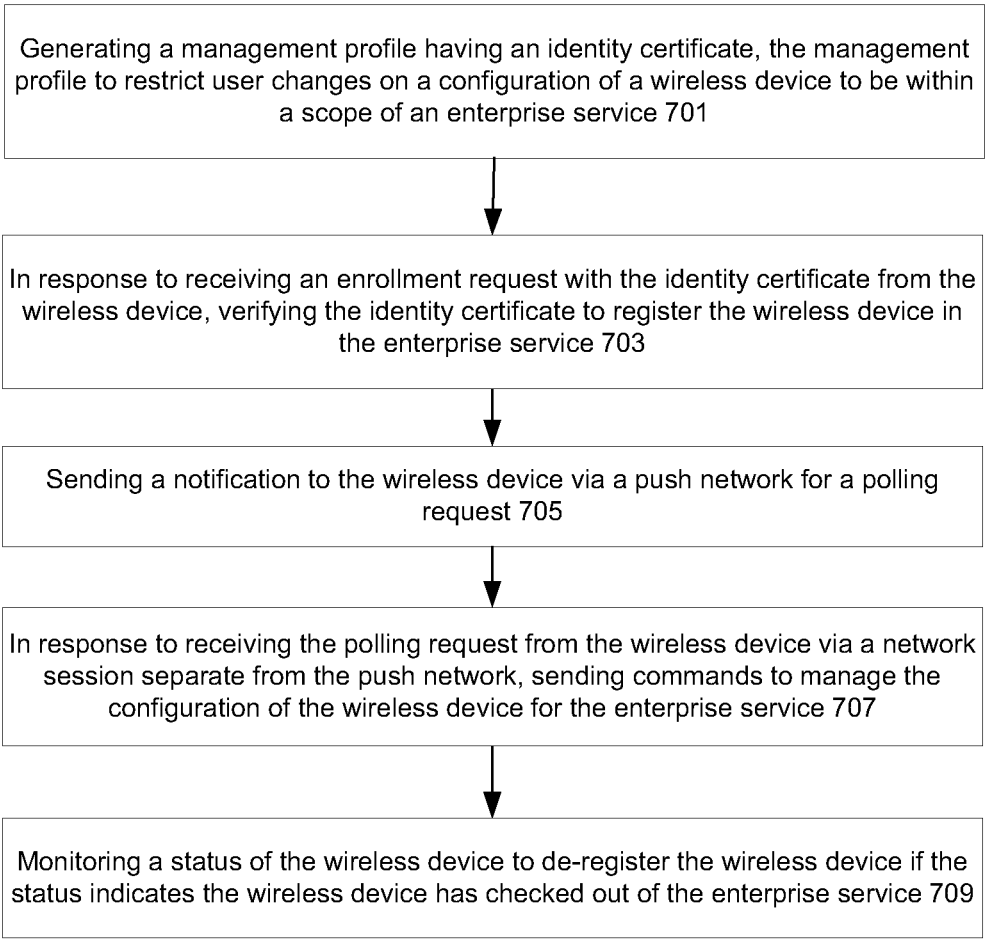
FIG. 7 is a flow diagram illustrating one embodiment of a process to command a mobile device remotely.

FIG. 7 is a flow diagram illustrating one embodiment of a process to command a mobile device remotely. Exemplary process 700 may be performed by a processing logic that may comprise hardware (circuitry, dedicated logic, etc.), software (such as is run on a dedicated machine), or a combination of both. For example, process 700 may be performed by some components of system 100 of FIG. 1. At block 701, the processing logic of process 700 can generate management profiles independent of specific mobile or wireless devices. Each management profile may be associated with a unique identity for limiting or restricting user changes permitted on a configuration of a wireless device within a scope of an enterprise service. The processing logic of process 700 may cryptographically sign the identity certificates (e.g. based on public private key pair algorithms) to ensure a trust can be verified. The management profiles may be distributed to wireless devices to enable the wireless devices to participate in the enterprise service via a variety of distribution mechanisms, such as emails, web pages, file disks, USB connections, over the air transmissions etc.

At block 703, in one embodiment, the processing logic of process 700 may receive an enrollment request from a wireless device, e.g. via a secure network session established from the wireless device. The enrollment request may carry an identity certificate included in a management profile being installed in the wireless device. In response, the processing logic of process 700 may verify if the identity certificate can be trusted. The processing logic of process 700 may register the wireless device in the enterprise service if the verification is successful. In one embodiment, to complete the enrollment, the processing logic of process 700 may receive identifiers for the wireless device (e.g. via the secure network connection established), such as a push token, a magic string and/or a topic string. The processing logic of process 700 may receive a message, e.g. a token update message for the push token, from the wireless device to indicate the management profile has been successfully installed in the wireless device.

At block 705, the processing logic of process 700 may send a notification to a wireless device, e.g. a target wireless device identified by a UDID, via a push network for the wireless device to poll commands required to manage the wireless device within a scope of an enterprise service. The notification may include a push token, a magic string and/or a topic string associated with the wireless device to allow the push network to deliver the notification to the wireless device and to ensure that the wireless device will accept the notification.

In one embodiment, at block 707, the processing logic of process 700 may receive a polling request from a wireless device via a secure network session (e.g. an HTTPS session) separate from a push network. The polling request may include a device identifier and or an identity certificate. In one embodiment, the processing logic of process 700 may cryptographically verify a trust of the wireless device using the identity certificate, e.g. for establishing the secure network session. Additionally, the processing logic of process 700 may ensure the identity of the wireless device, e.g. by matching the device identifier in the polling request with a UDID identifying a target device.

If a polling request is successfully verified, the processing logic of process 700 may send one or more commands in response to manage a configuration of the wireless device for an enterprise service. For example, the command can be a query command for inspecting a status of the wireless device to determine additional commands to configure the wireless device based on the status. Alternatively, the command may be a removal command to remove a provisioning profile from the wireless device to disable an application in the wireless device, or an installation command to install a provisioning profile into the wireless device to enable an application in the wireless device. Other types of commands to manage the wireless device may be applicable. The processing logic of process 700 may send a message to the wireless device to indicate no more management commands to be sent over the established secure network session. Subsequently, the secure network session may be terminated.

In some embodiments, the processing logic of process 700 may receive a rejection message from a wireless device in response to a command sent to the wireless device. The processing logic of process 700 may send the same command again later when receiving polling messages from the wireless device. The processing logic of process 700 may not need to send another push notification for the rejection message. However, in one embodiment, the processing logic of process 700 may send another push notification to the wireless device to have the wireless device send a polling message immediately.

At block 709, according to one embodiment, the processing logic of process 700 may monitor a status of a wireless device enrolled in an enterprise service to de-register the wireless device if the status indicates the wireless device has checked out of the enterprise service. For example, the processing logic of process 700 may periodically check if the wireless device is no longer responding to push notifications, e.g. via a feedback service in a push network.

Figure 8:
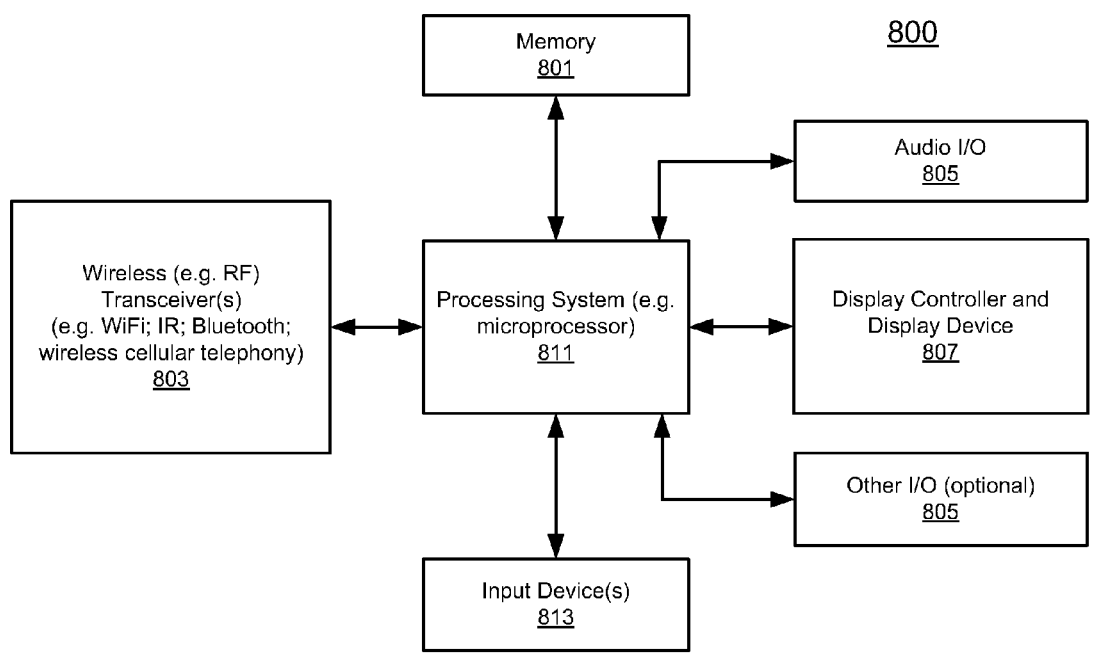
FIG. 8 shows one example of a data processing system which may be used with the embodiments described herein.

FIG. 8 shows one example of a data processing system which may be used with the embodiments described herein. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805 which may include a microphone and a speaker for, for example, playing back music or providing telephone functionality through the speaker and microphone. The system 800 can, in at least certain embodiments, request the one or more profiles described herein and download those profiles to configure the device for communication through a network. The system 800 can download those profiles from a server data processing system which may be the system shown in FIG. 7. In one embodiment, the system 800 may be the device 111 shown in FIG. 1.

A display controller and display device 807 provide a visual user interface for the user; this digital interface may include a graphical user interface which is similar to that shown on a Macintosh computer when running OS X operating system software. The system 800 also includes one or more wireless transceivers 803 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system.

The data processing system 800 also includes one or more input devices 813 which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or other types of data processing systems which have fewer components or perhaps more components than that shown in FIG. 8.

Figure 9:
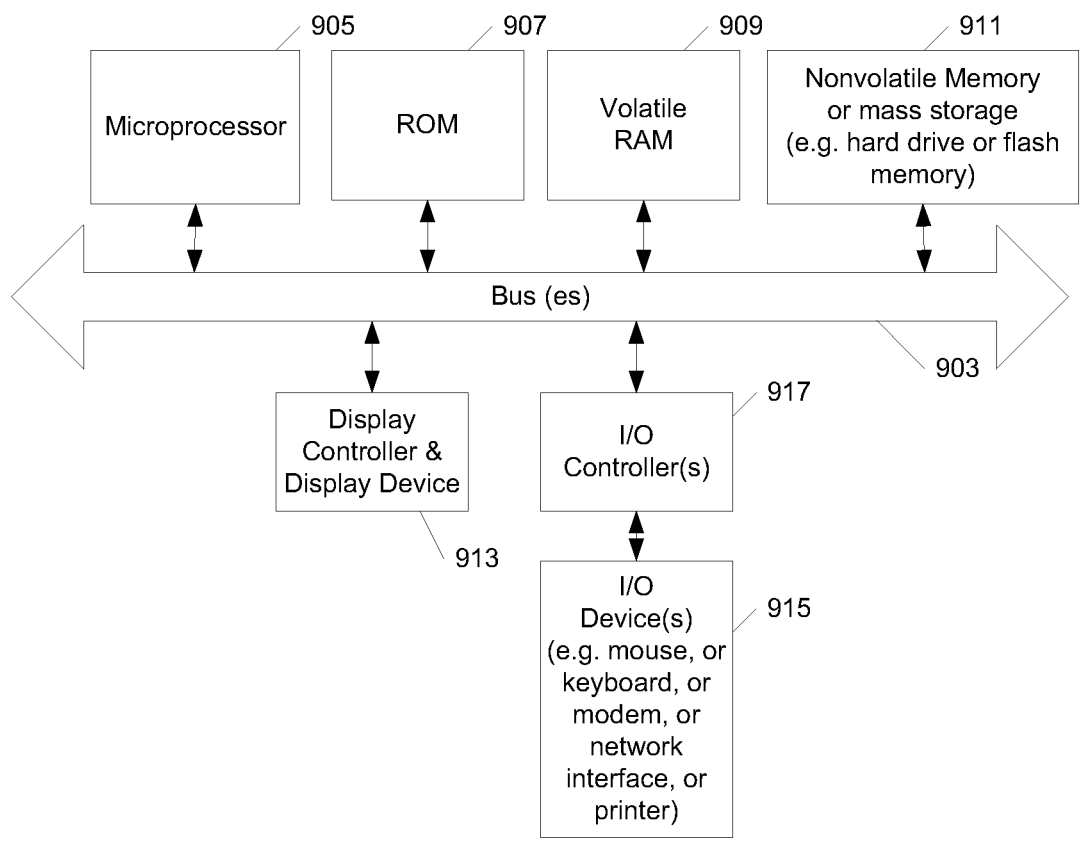
FIG. 9 illustrates an example of a typical computer system which may be used in conjunction with the embodiments described herein.

FIG. 9 shows one example of a data processing system which may be used with one embodiment of the present invention. Note that while FIG. 9 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 9 may represent the server system shown in FIG. 1.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory systems which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for managing a wireless device, the method comprising:
    sending, from the wireless device, an enrollment request to a management server addressed in a management profile stored in the wireless device,
    wherein the management profile includes a network address of the management server, an identity certificate, and a push string to be used by the wireless device to receive push notifications, and
    the enrollment request is a request to grant control of the wireless device to the management server in accordance with the management profile, the enrollment request including at least one device identifier uniquely identifying the wireless device, and a first verification string for verifying trust of the push notification, the first verification string uniquely identifying the wireless device;
    in response to receiving a push notification associated with the push string from a push server, verifying a trust of the push notification against the management profile stored in the wireless device,
    wherein verifying comprises extracting a second verification string from a payload of the push notification and comparing the first verification string to the second verification string,
    wherein the trust is verified when the first verification string matches the second verification string;
    establishing a secure network session with the management server if the trust is verified, the network session being secured via a certificate in the management profile; and
    performing management operations for management commands received over the secure network session to manage the configurations transparently to a user of the wireless device according to a control of configurations of the wireless device.

2. The method of claim 1, wherein the verifying further comprises:
    causing execution of a suspended process or thread to continue, wherein the verifying is performed using the process or thread.

3. The method of claim 2, wherein the enrollment comprises:
    sending a request for the enterprise service to the management server via the network address, the request including a device certificate cryptographically identifying the wireless device.

4. The method of claim 1, the at least one device identifier including a push token that enables push notifications sent by the push server to reach the wireless device.

5. The method of claim 1, wherein the performing the management operations comprises:
    requesting the update commands from the management server via the network session.

6. The method of claim 1, wherein the management operations include a query of a status of the configuration of the wireless device, the status indicates whether an application installed in the wireless device is provisioned in a provisioning profile.

7. The method of claim 6, wherein the management operations include removal of the provisioning profile to disable the application in the wireless device.

8. The method of claim 6, wherein the management operations include installing the provisioning profile to enable the application in the wireless device.

9. The method of claim 1, wherein the configuration includes an authorization data already expired for a capability provided by the enterprise service to the wireless device, and wherein the management operations include an update to bring the authorization data up to date.

10. A machine implemented method for managing a wireless device, the method comprising:
   installing a management profile into a configuration of the wireless device to participate in an enterprise service via a management server specified in the management profile, the configuration including one or more profiles to configure the wireless device;
   locking the configuration for the enterprise service via the management profile, the lock to restrict changes of the configuration from user instructions;
   sending, from the wireless device, an enrollment request to a management server addressed in the management profile,
   wherein the management profile includes a network address of the management server, an identity certificate, and a push string to be used by the wireless device to receive push notifications, and
   the enrollment request is a request to grant control of the wireless device to the management server in accordance with the management profile, the enrollment request including at least one device identifier uniquely identifying the wireless device, and a first verification string for verifying trust of the push notification, the first verification string uniquely identifying the wireless device;
   in response to receiving a push notification associated with the push string from the push server, verifying a trust of the push notification against the management profile stored in the wireless device,
   wherein verifying comprises extracting a second verification string from a payload of the push notification and comparing the first verification string to the second verification string,
   wherein the trust is verified when the first verification string matches the second verification string;
   in response to receiving one or more commands from the management server, transparently applying updates to the configuration of the wireless device, the updates to enable additional capabilities provided by the enterprise service to the wireless device and the updates to disable existing capabilities prohibited by the enterprise service in the wireless device; and
   in response to receiving a user instruction, uninstalling the management profile to leave the enterprise service.

11. The method of claim 10, wherein the uninstalling the management profile comprises:
   restoring the configuration from the updates; and
   unlocking the configuration from the management profile.

12. The method of claim 10, wherein the updates include one or more managed profiles installed from the management server, wherein the one or more managed profiles having dependency relationships, and wherein the application of the updates comprises:
   maintaining the dependency relationships rooted from the management server within the configuration.

13. The method of claim 12, wherein the uninstalling the management profile comprises:
   uninstalling the managed profiles according to the dependency relationships.

14. The method of claim 10, wherein the one or more profiles include a provisioning profile to authorize an application installed in the wireless device, wherein the application is outside of the enterprise service and wherein the updates include removal of the provisioning profile from the configuration.

15. The method of claim 10, wherein the one or more profiles include a first restriction profile specifying a first constraint on possible value of a setting in the wireless device, wherein the updates include installation of a second restriction profile specifying a second constraint on the possible value of the setting, wherein the setting has a value satisfying both the first constraint and the second constraint during the participation of the enterprise service.

16. The method of claim 15, wherein the setting has a first value prior to the participation of the enterprise service, the first value contradicting the second constraint, and wherein the updates include changing the setting from the first value to the value.

17. The method of claim 16, wherein the second restriction profile is uninstalled if the management profile is uninstalled.

18. The method of claim 10, wherein the application of the updates comprises installing a profile from the management server into the configuration of the wireless device.

19. The method of claim 10, wherein the application of the updates comprises removing a profile from the configuration of the wireless device.

20. The method of claim 10, wherein the application of the updates comprises replacing one of the one or more profiles in the configuration of the wireless device.

21. A machine implemented method for configuring a wireless device, the method comprising:
   sending, from the wireless device, an enrollment request to a management server addressed in a management profile in a configuration stored in the wireless device,
   wherein the management profile includes a network address of the management server, an identity certificate, and a push string to be used by the wireless device to receive push notifications, and
   the enrollment request is a request to grant control of the wireless device to the management server in accordance with the management profile, the enrollment request including at least one device identifier uniquely identifying the wireless device, and a first verification string for verifying trust of the push notification, the first verification string uniquely identifying the wireless device;
   in response to receiving a push notification associated with the push string from the push server, verifying a trust of the push notification against the management profile stored in the wireless device,
   wherein verifying comprises extracting a second verification string from a payload of the push notification and comparing the first verification string to the second verification string,
   wherein the trust is verified when the first verification string matches the second verification string;
   cryptographically establishing a first network connection with a management server if the trust is verified, the first network connection associated with parameters based on the management profile;
   in response to receiving a command from the management server via the first network connection, determining if a condition to perform an operation for the command on the configuration is satisfied; and
   sending a reply to the management server, the reply indicating whether the operation has been performed according to the determination.

22. The method of claim 21, wherein the management profile specifies one or more rights, wherein the command violates at least one of the rights and wherein the reply indicates the condition cannot be satisfied to perform the operation for the command.

23. The method of claim 21, wherein the condition is determined not yet satisfied, the method further comprising:
waiting in a sleep state for the condition to be satisfied; and
cryptographically establishing a second network connection with the management server for receiving the command when the condition is satisfied.

24. The method of claim 21, wherein the waiting comprises:
terminating the first network connection; and
storing a cookie data indicating the command for the enterprise service.

25. The method of claim 24, further comprising:
registering an event associated with the condition; and
waking up in response to receiving a notification of the event.

26. The method of claim 21, wherein the push notification is received via a push network separate from the first network connection.

27. The method of claim 21, wherein the wireless device stores at least one identity, wherein the push notification includes payload data, further comprising:
generating the at least one identity, wherein the authenticity of the push notification depends on whether the payload data includes the at least one identity.

28. The method of claim 21, wherein the operation adds restrictions to the configuration and where in the restrictions prohibit enabling of an application installed in the wireless device.

29. The method of claim 21, wherein the management profile includes an identity certificate, and wherein the first network connection is based on HTTPS (Hypertext Transfer Protocol Secure) authenticated via the identity certificate.

30. The method of claim 21, further comprising:
sending a polling request to the management server via the first network connection transparently to a user, the polling request indicating the wireless device is ready to receive the command.

31. The method of claim 30, further comprising:
sending another polling request separate from the polling request to the management server via the first network connection after the operation is successfully performed.

32. The method of claim 21, wherein the wireless device is locked by a user, wherein the operation includes a change to the configuration, and wherein the condition depends on when the wireless device is unlocked by the user.

33. The method of claim 21, wherein the condition is associated with a current processing load of the wireless device, and wherein the condition is satisfied if the current processing load is below a threshold specified in the configuration.

34. A machine implemented method for mobile device management, the method comprising:
generating a management profile having an identity certificate, the management profile to restrict user changes on a configuration of a wireless device to be within a scope of an enterprise service;
in response to receiving an enrollment request with the identity certificate from the wireless device, verifying the identity certificate to register the wireless device in the enterprise service, wherein the enrollment request includes at least one device identifier uniquely identifying the wireless device, and a first verification string for verifying trust of the push notification, the first verification string uniquely identifying the wireless device;
sending a push notification to the wireless device via a push server for a polling request, the push notification including the first verification string; and
in response to receiving the polling request from the wireless device via a network session separate from the push network, sending commands to manage the configuration of the wireless device for the enterprise service.

35. The method of claim 34, wherein the notification includes a push token to enable the notification to reach the wireless device via the push network, wherein the enrollment request is received via a particular network session, and wherein the push token is received from the wireless device via the particular network session.

36. The method of claim 34, wherein the wireless device is associated with a UDID (unique device identifier) in the enterprise service, wherein the polling request includes a device identifier, and wherein the sending the commands comprises:
verifying an identity of the wireless device based on the UDID and the device identifier.

37. The method of claim 34, wherein the polling request includes an identity certificate, the method further comprising:
cryptographically verifying a trust of the wireless device based on the identity certificate.

38. The method of claim 34, wherein the push network is a 3G network over the air.

39. The method of claim 34, wherein the commands include a query command for inspecting a status of the wireless device.

40. The method of claim 39, further comprising:
determining additional commands for the wireless device based on the status.

41. The method of claim 40, wherein the status indicates a provisioning profile authorizing an application outside the scope of the enterprise service, and wherein the additional commands include a removal command to remove the provisioning profile.

42. The method of claim 34, wherein the commands include an installation command for installing a provisioning profile to the wireless device, the provisioning profile authorizing an application installed in the wireless device.

43. A non-transitory machine-readable storage medium having instructions, when executed by a machine, cause the machine to perform a method for a plurality of messaging services, the method comprising:
sending, from a wireless device, an enrollment request to a management server addressed in a management profile stored in the wireless device,
wherein the management profile includes a network address of the management server, an identity certificate, and a push string to be used by the wireless device to receive push notifications, and
the enrollment request is a request to grant control of the wireless device to the management server in accordance with the management profile, the enrollment request including at least one device identifier uniquely identifying the wireless device, and a first verification string for verifying trust of the push notification, the first verification string uniquely identifying the wireless device;
in response to receiving a push notification associated with the push string from a push server, verifying a trust of the push notification against the management profile stored in the wireless device, wherein verifying comprises extracting a second verification string from a payload of the push notification and comparing the first verification string to the second verification string, wherein the trust is verified when the first verification string matches the second verification string;

establishing a secure network session with the management server if the trust is verified, the network session being secured via a certificate in the management profile; and performing management operations for management commands received over the secure network session to manage the configurations transparently to a user of the wireless device according to the control.

44. An apparatus, comprising:

a memory storing executable instructions;

a network interface coupled to a push network;

a processor coupled to the network interface and the memory to execute the executable instructions from the memory for the messaging services, the processor being configured to:

send, from a wireless device, an enrollment request to a management server addressed in a management profile stored in the wireless device, wherein the management profile includes a network address of the management server, an identity certificate, and a push string to be used by the wireless device to receive push notifications, and the enrollment request is a request to grant control of the wireless device to the management server in accordance with the management profile, the enrollment request including at least one device identifier uniquely identifying the wireless device, and a first verification string for verifying trust of the push notification, the first verification string uniquely identifying the wireless device;

in response to receiving a push notification associated with the push string from a push server via the push network, verify a trust of the push notification against the management profile;

wherein verification comprises extracting a second verification string from a payload of the push notification and comparing the first verification string to the second verification string, wherein the trust is verified when the first verification string matches the second verification string;

establish a network session with the management server if the trust is verified, the network session being secured via a certificate in the management profile; and perform management operations for management commands received over the secure network session to manage the configurations transparently to a user of the wireless device according to the control.

* * * * *